UNITED STATES PATENT OFFICE.

PHILIP L. SYLVESTER, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 229,494, dated June 29, 1880.

Application filed May 8, 1880. (No specimens.)

*To all whom it may concern:*

Be it known that I, PHILIP L. SYLVESTER, of Auburn, in the county of Cayuga, and in the State of New York, have invented certain new and useful Improvements in the Manufacture of Buttons from Plastic Material, (Case G;) and I do hereby declare that the following is a full, clear, and exact description thereof.

The design of my invention is to produce from plastic material a button which shall resemble buttons manufactured from bone; to which end it consists, as an improvement in the manufacture of buttons from plastic material, in a plastic material composed of bleached shellac and mineral white, substantially as and for the purpose specified.

In the manufacture of buttons, I take one part of powdered bleached shellac and two parts of mineral white (carbonate of lime) and no pigments, and, after thoroughly mixing the same, pass the mixture through heated rollers until the mass becomes homogeneous and plastic; after which it is rolled into sheets and passed through button-dies in the usual manner.

The composition thus produced has a translucent appearance which closely resembles bone, and buttons produced therefrom cannot be easily distinguished from those made from bone.

This composition may be employed for surfacing other less expensive compositions, and for such purpose gives a depth and transparency of surface not otherwise obtainable.

Having thus fully set forth the nature and merits of my invention, what I claim as new is—

As an improvement in the manufacture of buttons from plastic material, a plastic material composed of bleached shellac and mineral white without pigments, substantially as and for the purpose specified.

In testimony that I claim the foregoing I have hereunto set my hand this 5th day of May, 1880.

P. L. SYLVESTER.

Witnesses:
P. C. WOODRUFF,
H. WOODRUFF.